Feb. 23, 1965    S. T. WILLIAMS    3,170,243
TIRE TREAD-DEPTH GAUGE

Filed Sept. 13, 1961    2 Sheets-Sheet 1

INVENTOR
Selden T. Williams
BY
H. F. Johnston
ATTORNEY

Feb. 23, 1965  S. T. WILLIAMS  3,170,243
TIRE TREAD-DEPTH GAUGE
Filed Sept. 13, 1961  2 Sheets-Sheet 2

INVENTOR
Selden T. Williams
BY
H. F. Johnston
ATTORNEY 3,170,243
TIRE TREAD-DEPTH GAUGE
Selden T. Williams, Middlebury, Conn., assignor to Scovill Manufacturing Company, Waterbury, Conn., a corporation of Connecticut
Filed Sept. 13, 1961, Ser. No. 137,867
6 Claims. (Cl. 33—169)

This invention relates to a tire gauge for measuring the depth of a tire tread and also to a record card to be used in conjunction with said gauge.

One of the objects of this invention is to provide a tire-depth gauge of simple construction with a depth-measuring finger which is frictionalized without the use of any metal spring.

A further object is to provide a tire-depth gauge that has a means for determining if the gauge has been properly applied to the tire so that an accurate reading of the tread depth is assured.

Another object is to provide a record card to be used in association with the gauge so that a permanent record of the tire wear can be kept as periodic checks are made.

Two embodiments of the invention are shown in the accompanying drawings, in which.

Figure 1:
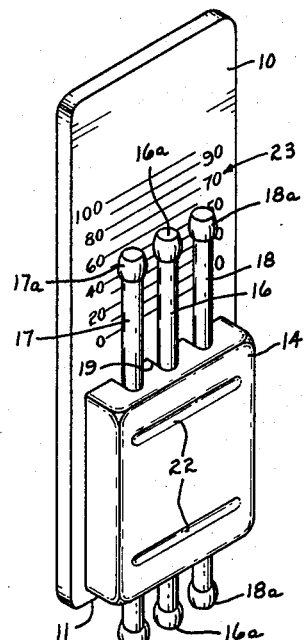
FIG. 1 is a perspective view of a tire-depth gauge showing the preferred form of my invention.
Figure 2:
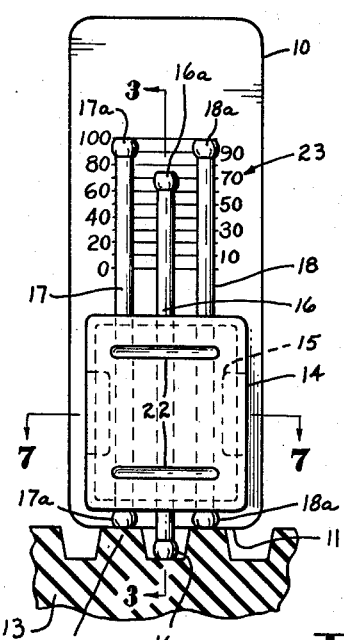
FIG. 2 is a front view of the same showing it as applied to a tire tread.
Figure 3:
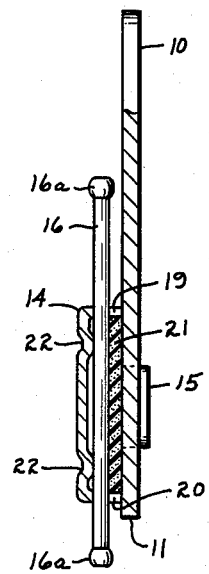
FIG. 3 is a vertical sectional view of the same taken along line 3—3 of FIG. 2.

Referring now to the drawing, the numeral 10 designates a flat support plate, preferably of rectangular shape, having a base end 11 adapted to be seated against the worn surface of a tread 12 of a tire shoe 13 as shown in FIG. 2. A housing 14 is attached to the front face of the plate 10 adjacent the base end 11 by a pair of lugs 15 that pass through suitable openings in the support plate and are bent over against the back thereof. In the housing 14 is slidably fitted a central gauge rod or finger 16 having opposite headed ends 16a. Also, a pair of lateral gauge-stabilizing rods or fingers 17 and 18 having opposite headed ends 17a and 18a are likewise slidably fitted in said housing, one on each side of said central gauging finger. As best shown in FIG. 3, the central finger 16 is shown as guided in suitable slots 19 and 20 provided in the upper and lower walls respectively of the housing 14, and it will be understood that the stabilizing fingers will be similarly guided in like slots.

In order to impart a fractional resistance to the adjustable fingers 16, 17 and 18 to maintain them in set position, I preferably use a piece of cellular rubber material 21, such as neoprene sponge, that is fitted into the housing 14 and into which material that portion of the fingers confined within the housing 14 is deeply compressed. The fingers are held in forced embedded engagement in the material 21 by the inner surface of a pair of spaced ribs 22 formed inwardly of the outer face of the housing 14 and thus are suitably frictionalized without the use of any metal springs.

Figure 7:
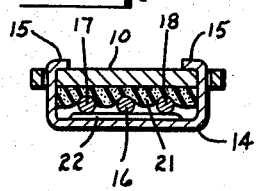
FIG. 7 is a transverse cross-sectional view taken along the line 7—7 of FIG. 2.

On the front face of the plate 10 is printed an arbitrary set of calibrations or indicia reading from 0 to 100 in increments of 10. These figures, however, do not present an accurate percentage wear of any tire to which the gauge may be applied. It is well known in the tire market that there are various standard depths for tire treads given in thousandths inches, the standard being in the order of $D=.312$; $D=.343$; $D=.375$; $D=.406$. On the back of the support plate 10 a conversion chart may be printed such as shown in FIG. 7 so that readings taken from the arbitrary scale on the front of the gauge can be compared wtih the appropriate conversion chart on the back of the plate for a determination of the percentage tire wear.

Figure 5:
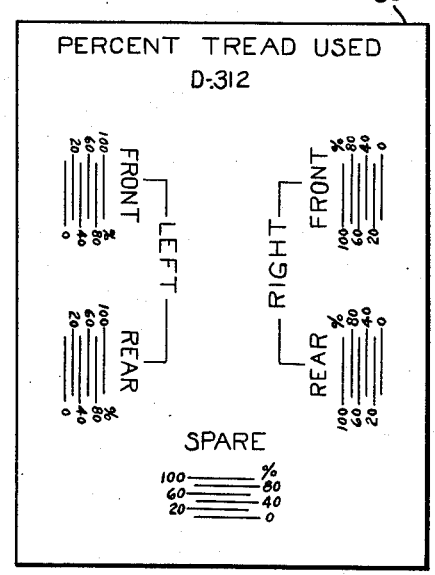
FIG. 5 is a lay-out view of a record card such as could be used in association with my invention.

When it is desired to keep a periodic record of the tread depth on a tire, a record card 30 as shown in FIG. 5 can be printed with unit calibrations for each wheel of the car, including the spare. The card 30 as shown is laid out to be used with a tire having a tread depth of $D=.312$. Corresponding cards can be made to suit any standard depth.

In the operation of this tire wear gauge, when it is desired to make a wear inspection of any tire, the three fingers or rods 16, 17 and 18 will be depressed so that their lower headed ends will be set well below the base end 11 of the support plate 10. The gauge may then be set upon a tire tread with the head of the central gauging finger 16 resting in the base of the tire tread. The gauge must then be pushed down until the plate base end 11 rests against the top of the tire tread whereupon the three fingers will be forced upwardly with the lower head of the central finger resting in the depression of the tire tread. The gauge may then be removed from the tire and the reading taken on the arbitrary scale 23 shown in FIG. 2. The reading will be converted to a percentage wear by comparing the gauge reading with the appropriate conversion chart on the back of the scale as shown in FIG. 7.

Figure 6:
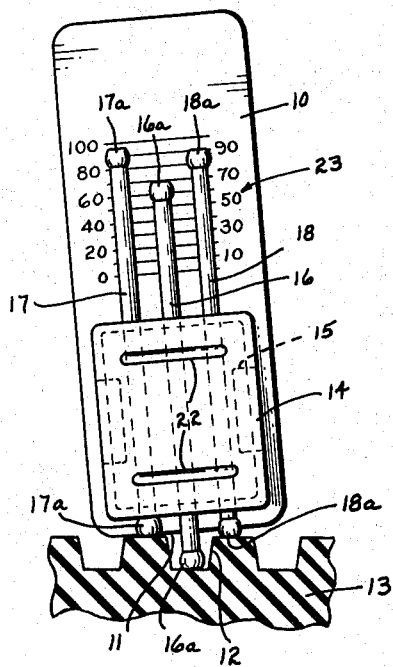
FIG. 6 is a view similar to FIG. 2 but showing the gauge as it would appear if misapplied to a tire.
Figure 8:
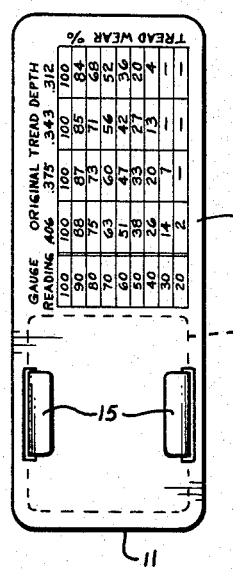
FIG. 8 is a rear view of the gauge showing the conversion chart.

If perchance, the gauge has not been properly applied to the tire, such as not setting it in the proper upright position to the tire tread, it will be indicated by the two lateral stabilizing fingers 17 and 18, the upper ends of which will not be in aligned registry with the uppermost index line 100 and will be apparent after the gauge is removed from the tire as shown in FIG. 6.

Figure 4:
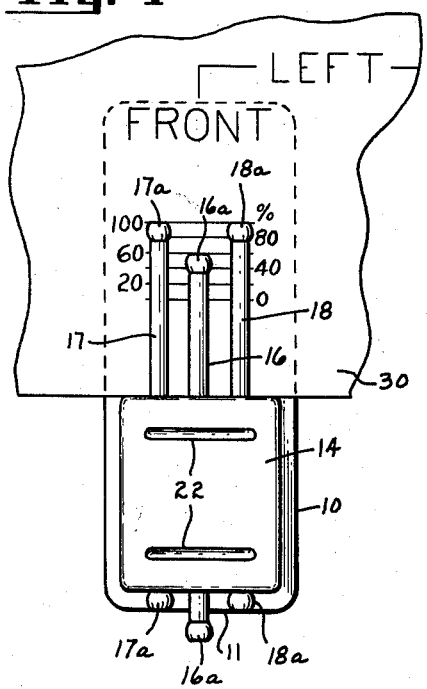
FIG. 4 is a front view of the gauge similar to FIG. 2 but showing a record card applied thereto.

If it is desired to make a record of the tire inspection, the record card 30 may be inserted between the support plate 10 and the three fingers, and brought to rest upon the top of the housing 14 as shown in FIG. 4, with the proper tire indicia registered with the fingers and the reading taken by the central finger. In this case, it is the front left tire and the gauge shows a tread wear of 60%. This is marked on the chart in the position corresponding to the tread measured; all tires and the spare on the car may be charted for record and customer's advice.

Figure 9:
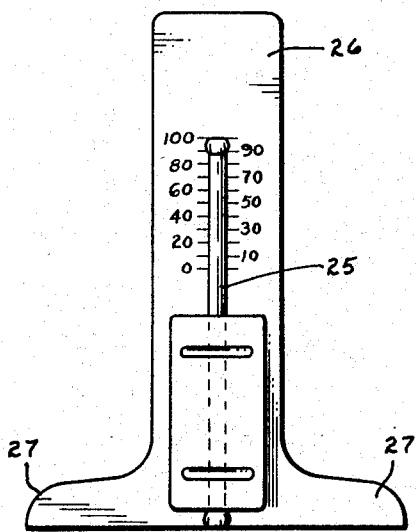
FIG. 9 is a front view of a modified form of construction.

FIG. 9 shows a modified form wherein only a single depth-indicating finger 25 is employed. In this form, the support plate 26 is provided with a pair of laterally-extending wings 27 constituting the base of the gauge. The wings 27 will better serve as a means to span a greater portion of the tire tread and assure that the gauge is positioned normal to the tire tread so that the proper reading of the tread depth can be obtained. Otherwise, the construction of this form is similar in all respects to the first form described.

It will be understood that various other modifications may be resorted to within the scope and spirit of this invention as defined by the appended claims.

What I claim is:

1. A tire tread-depth gauge comprising a flat support plate having a base end adapted to rest against a tire tread, a housing fixed to said plate and located adjacent the base end of said support plate, an adjustable rod-like depth-indicating finger slidably mounted in said housing and of such length that one end of said finger will extend well above said housing when its opposite end is flush with said base, a piece of elastomeric material confined within said housing between said finger and support plate and serving to hold said finger in parallel spaced relationship to said plate, a pair of ribs formed inwardly of said housing and bearing against said finger to embed it within said elastomeric material in order to impart frictional resistance to said finger, said plate having suitable indicia imprinted thereon to indicate tire tread depth as determined by the position of the upper end of said finger.

2. A tire tread-depth gauge as defined in claim 1 wherein a pair of stabilizing rods are frictionally mounted in said housing, one on each side of said depth-indicating finger.

3. A tire tread-depth gauge comprising a flat support plate having a base end adapted to rest against a tire tread, a housing fixed to said plate and located adjacent the base end of said support plate, an adjustable rod-like depth-indicating finger slidably mounted in said housing in parallel spaced relationship to said plate and of such length that one end of said finger will extend well above said housing when its opposite end is flush with said base, said finger having enlarged heads at its opposite ends to prevent its removal from said housing, a piece of elastomeric material confined within said housing on one side of said finger, and means bearing against the other side of said finger to embed it within said elastomeric material in order to impart frictional resistance to said finger, said plate having suitable indicia imprinted thereon to indicate tire tread-depth as determined by the position of the upper end of said finger.

4. A tire tread-depth gauge comprising a flat support plate having a base end adapted to rest against a tire tread, a housing fixed to said plate and located adjacent the base end of said support plate, said housing having aligned slots in its upper and lower walls, a depth-indicating finger slidably mounted in said slots and being of such length that one end of said finger will extend well above said housing when the opposite end is flush with said base, said finger having means at its opposite ends of larger dimensions than said slots to prevent said finger from being removed from said housing, a piece of elastomeric material confined within said housing between said plate and rods and serving to hold said finger in parallel spaced relationship to said plate, and means forcing said finger into embedded engagement with said elastomeric material in order to impart frictional resistance to the movement of said fingers.

5. A tire tread-depth gauge comprising a support plate having a base end adapted to rest against a tire tread, a housing fixed to said plate and located adjacent the base end of said support, a plurality of three rods slidably mounted in said housing, said middle rod being a depth-indicating rod and the opposite side rods being stabilizing rods to indicate a proper setting of the gauge upon a tire, and means frictionalizing said rods in said housing, said plate having suitable indicia printed thereon above said housing to indicate tire tread-depth as determined by the position of the upper end of said middle rod.

6. A tire tread-depth gauge as defined in claim 5 wherein enlarged heads are provided on the opposite ends of each of said rods.

References Cited by the Examiner

UNITED STATES PATENTS

| 363,657 | 5/87 | MacKenzie | 33—23 |
| 365,385 | 6/87 | Johnson | 33—175 |
| 2,550,508 | 4/51 | Wiedemer. | |
| 2,619,727 | 12/52 | Krohn | 33—172 |
| 2,662,295 | 12/53 | Heal | 33—169 |

FOREIGN PATENTS 28,069  12/06  Great Britain.

ISAAC LISANN, *Primary Examiner.*